(12) United States Patent
Mackowiak

(10) Patent No.: US 9,439,356 B1
(45) Date of Patent: Sep. 13, 2016

(54) ANTI-JACKKNIFE GANG MOWER HITCH

(76) Inventor: Richard G. Mackowiak, Eastford, CT (US)

( * ) Notice: Subject to any disclaimer, the term of this patent is extended or adjusted under 35 U.S.C. 154(b) by 75 days.

(21) Appl. No.: 13/136,614

(22) Filed: Aug. 8, 2011

(51) Int. Cl.
*A01D 75/30* (2006.01)

(52) U.S. Cl.
CPC ............. *A01D 75/306* (2013.01); *A01D 75/30* (2013.01)

(58) Field of Classification Search
USPC ........................................ 56/6, 7, 15.7, 15.8
See application file for complete search history.

(56) References Cited

U.S. PATENT DOCUMENTS

| | | | |
|---|---|---|---|
| 3,514,126 A | 5/1970 | Fuss | 280/411 |
| 3,608,284 A | 9/1971 | Erdman | 56/6 |
| 3,619,996 A * | 11/1971 | Jacobson et al. | 56/13.6 |
| 3,717,981 A * | 2/1973 | van der Lely | 56/6 |
| 3,720,048 A * | 3/1973 | Grubb et al. | 56/15.9 |
| 3,757,500 A | 9/1973 | Averitt | 56/6 |
| 3,832,834 A | 9/1974 | Kovacs | 56/6 |
| 4,063,748 A | 12/1977 | Schmidt | 280/411 |
| 4,079,960 A | 3/1978 | Carson | 280/472 |
| 4,123,082 A | 10/1978 | Conner | 280/467 |
| 4,637,625 A | 1/1987 | Blackwell | 280/411 |
| 4,744,580 A | 5/1988 | Ryan | 280/411 |
| 4,815,259 A | 3/1989 | Scott | 56/6 |
| 4,854,112 A * | 8/1989 | Holley et al. | 56/6 |
| 4,870,810 A | 10/1989 | Gordy | 56/6 |
| 4,896,485 A | 1/1990 | Gordy | 56/6 |
| 5,423,565 A | 6/1995 | Smith | 280/411.1 |
| 5,694,752 A * | 12/1997 | Warfield, III | 56/13.6 |
| 5,851,020 A | 12/1998 | Godwin | 280/413 |
| 6,094,896 A * | 8/2000 | Lane | 56/13.7 |
| 6,116,007 A * | 9/2000 | Eggena et al. | 56/15.1 |
| 6,497,086 B2 * | 12/2002 | Bergsten et al. | 56/15.8 |
| 6,526,735 B2 * | 3/2003 | Meyer | 56/6 |
| 7,287,363 B2 | 10/2007 | Phillips | 56/7 |
| 7,347,036 B1 | 3/2008 | Easley, Jr. | 56/6 |
| 7,793,487 B1 * | 9/2010 | Schnell et al. | 56/6 |
| 8,166,735 B1 * | 5/2012 | Schnell | 56/6 |

* cited by examiner

*Primary Examiner* — Alicia Torres

(57) ABSTRACT

A hitch that connects one propelled mower assembly to one or more non-propelled mower assemblies, allowing the non-propelled mower to be pushed or pulled without jackknifing, while the individual mower decks are free to follow the terrain independently of each other. The hitch has two rigid connectors pivotally attached to and interconnecting the propelled mower and the non-propelled mower. Each mower deck can move freely relative to its lateral and longitudinal axes independent of each other.

15 Claims, 5 Drawing Sheets

ANTI-JACKKNIFE GANG MOWER HITCH

FEDERALLY SPONSORED RESEARCH

Not Applicable

SEQUENCE LISTING OR PROGRAM

Not Applicable

BACKGROUND

1. Field of Invention

This invention relates to hitches used to join together multiple pieces of equipment, such as a plurality of rotary lawn mowers, so that they travel as a single unit.

2. Description of Prior Art

Three desirable features in a gang mower are: wider cutting swath, flexibility to follow the terrain, and maneuverability. A wider cutting swath reduces the time required to cut a given area making them desirable to maintain large lawns. Designs that include separate components that have the ability to move independently of each other result in a more even cut. The assembly should be easy to maneuver, in both forward and reverse, on turns, and in tight places. Prior art fails to successfully combine these three attributes in a single unit.

Several patents such as: U.S. Pat. No. 3,608,284 issued to Leon Paul Erdman on Sep. 28, 1971; U.S. Pat. No. 4,063,748 issued to Richard H. Schmidt on Dec. 20 1977; U.S. Pat. No. 7,287,363 issued to David Lawrence Phillips on Oct. 30, 2007; require special components. My invention can utilize commercially available off-the-shelf components. These prior art designs are meant to travel in only one direction while my invention performs well in either direction. The towed mowers in U.S. Pat. No. 3,608,284 and U.S. Pat. No. 4,063,748 are designed to be pulled.

Several patents such as: U.S. Pat. No. 3,514,126 issued to William H. Fuss May 26, 1970; U.S. Pat. No. 4,079,960 issued to Raymond M. Carson on Mar. 21, 1978; U.S. Pat. No. 4,123,082 issued to Joe D. Conner on Oct. 31, 1978; U.S. Pat. No. 4,637,625 issued to John B. Blackwell on Jan. 20, 1987; U.S. Pat. No. 4,744,580 issued to Charles C. Ryan on May 17, 1988; U.S. Pat. No. 5,423,565 issued to Frederick Smith on Jun. 13, 1995; U.S. Pat. No. 7,347,036 issued to Easley, Jr.; J. Alexander on Mar. 25, 2008; have towed mowers that are susceptible to jackknifing when traveling in reverse.

Several patents such as: U.S. Pat. No. 4,815,259 issued to Wayne Scott on Mar. 28, 1989; U.S. Pat. No. 4,870,810 issued to Donald G. Gordy on Oct. 3, 1989; U.S. Pat. No. 4,896,485 issued to Donald G. Gordy on Jan. 30, 1990; U.S. Pat. No. 5,851,020 issued to Lawrence A. Godwin Dec. 22, 1998; have a group of towed mowers that is susceptible to jackknifing when traveling in reverse. Furthermore, each individual mower in the groups is susceptible to jackknifing when traveling in reverse.

Several patents such as: U.S. Pat. No. 3,757,500 issued to Marnie C. Averitt on Sep. 11, 1973 (preferred embodiment); U.S. Pat. No. 3,832,834 issued to George E. Kovacs on Sep. 3, 1974; have a group of mowers that is susceptible to jackknifing when traveling in reverse.

OBJECTS AND ADVANTAGES

Accordingly, in addition to providing the common desirable features including wider cutting swath, and more even cut that results from individual decks that can follow irregular terrain, several objects and advantages of my invention are:

(a) the ability to travel forward and reverse without jackknifing;

(b) the option of mounting the non-propelled mowers towards the rear or the front of the propelled mower;

(c) attaching and detaching is simple, for storage or to free the components for independent use;

(d) conventional commercially available off-the-shelf components can be used;

(e) the option to attach as many non-propelled units as desired.

SUMMARY

The hitch of my invention connects a propelled mower assembly with one or more non-propelled mower assemblies. The hitch allows the propelled mower to push or pull the non-propelled mowers without jackknifing. The mower decks are free to follow the terrain independently of each other. The desired individual movement includes roll relative to a longitudinal axis of each deck, and pitch relative to a lateral axis of each deck. The non-propelled mower decks are rigidly held by the hitch relative to a vertical axis of each non-propelled mower deck. The yaw movement of the non-propelled mower is coaxial with the vertical axis of the propelled mower assembly. The hitch does not allow the non-propelled mower assembly to pivot in the yaw direction relative to its own vertical axis. My invention solves the problem of maneuverability experienced by prior art. The entire assembly combines the quality cut of individual mowers with the maneuverability of a single machine. The unit performs equally well in the forward or reverse travel directions. The hitch is simple. The hitch can be made to fit existing mowers of various designs. The mower decks can be located close together minimizing the amount of overlap required thereby maximizing the cutting swath. Having the decks close together also improves maneuverability, storage, and transportation because the entire machine has a smaller footprint.

DRAWINGS

Drawing Figures

FIG. 2 is a view showing the control arm looking straight on.

Figure 7:
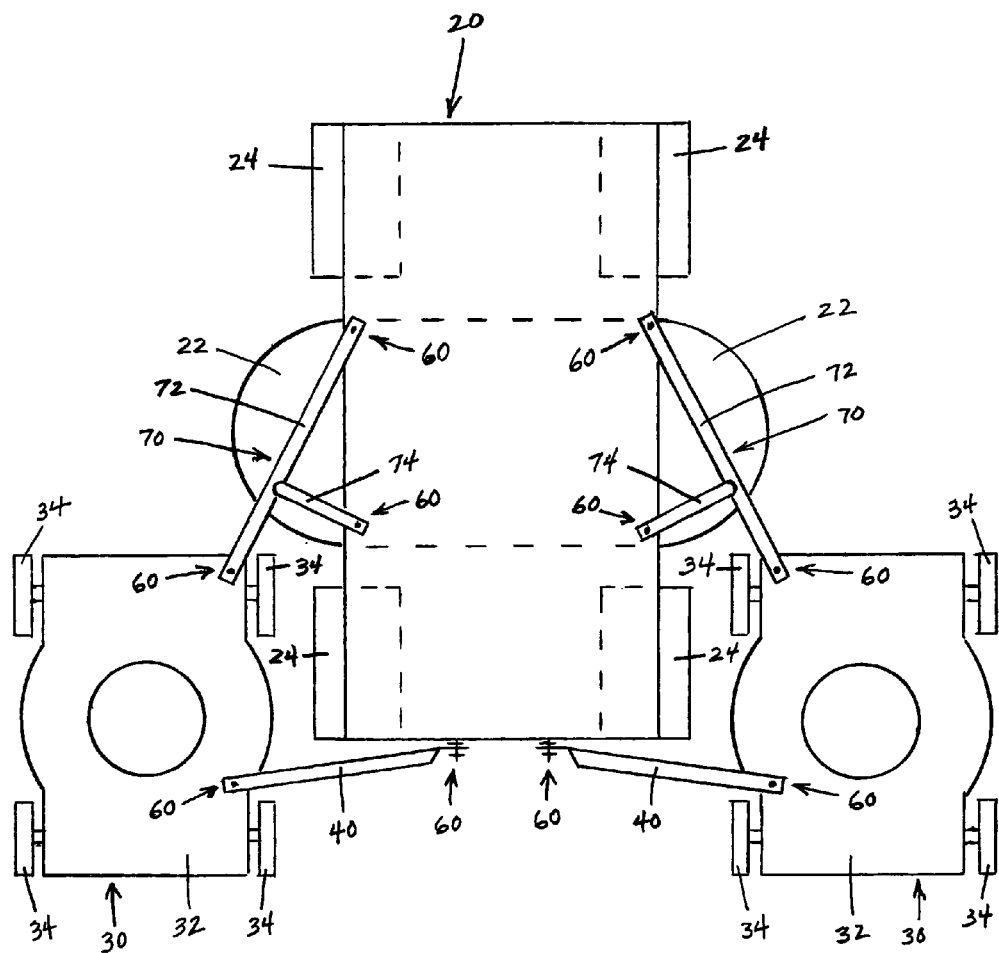

FIG. 7 is an example of an alternate embodiment. FIG. 7 is a top view showing the hitch connecting two non-propelled mowers to a propelled mower. This alternate embodiment utilizes y-arms in lieu of bracket assemblies shown in the preferred embodiment. This alternate embodiment utilizes the same control arm used in the preferred embodiment.

REFERENCE NUMERALS IN DRAWINGS 20 propelled mower assembly
22 mower deck of propelled mower assembly 24 wheel of propelled mower assembly
30 non-propelled mower assembly
32 mower deck of non-propelled mower assembly
34 wheel of non-propelled mower assembly
40 control arm
50 bracket assembly
52 longitudinal component of bracket assembly
54 lateral component of bracket assembly
60 joint assembly
62 joint stud
64 joint nut
66 joint nut
68 joint nut
70 y-arm bracket assembly
72 y-arm main beam
74 y-arm brace beam

DETAILED DESCRIPTION

Description—FIG. 1 Through 6—Preferred Embodiment

Figure 1:
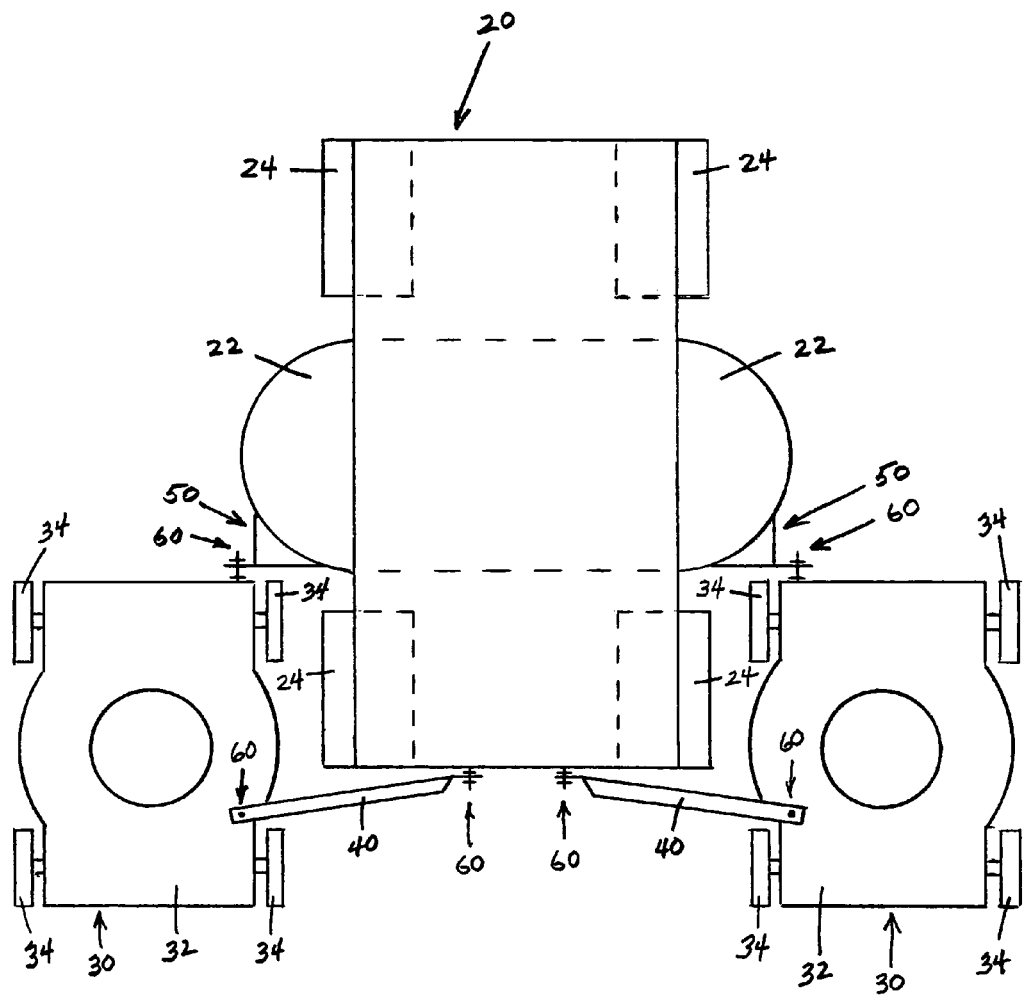
FIG. 1 is a top view showing the hitch connecting two non-propelled mowers to a propelled mower.

The hitch shown in FIG. 1 joins a non-propelled mower assembly 30 to a propelled mower assembly 20. The hitch is comprised of two parts.

The first part of the hitch is a bracket assembly 50 which is securely fastened to the mowing deck of the propelled mower 22. A joint assembly 60 connects the bracket assembly 50 to the non-propelled mower assembly 30. The joint allows the non-propelled mower assembly 30 to roll relative to its longitudinal axis. The joint also accommodates a wide range of angular motion relative to its lateral axis, permitting the non-propelled mower assembly 30 to pitch as necessary relative to its lateral axis.

The second part of the hitch is a control arm 40. One end of control arm 40 is fastened to the propelled mower assembly 20 via a joint assembly 60. The other end of control arm 40 is fastened to the mower deck of the non-propelled mower 32 via a joint assembly 60.

The two joint assemblies 60 located on the non-propelled mower assembly 30 allow the non-propelled mower assembly 30 to roll relative to its longitudinal axis in order to follow the terrain. Furthermore, the two joint assemblies 60 located on the non-propelled mower assembly 30 allow sufficient angular movement that allow the non-propelled mower assembly 30 freedom to pitch relative to its lateral axis in order to follow the terrain. However, the two parts of the hitch work together to prevent the non-propelled mower assembly 30 from moving in the yaw direction relative to its vertical axis.

Figure 6:
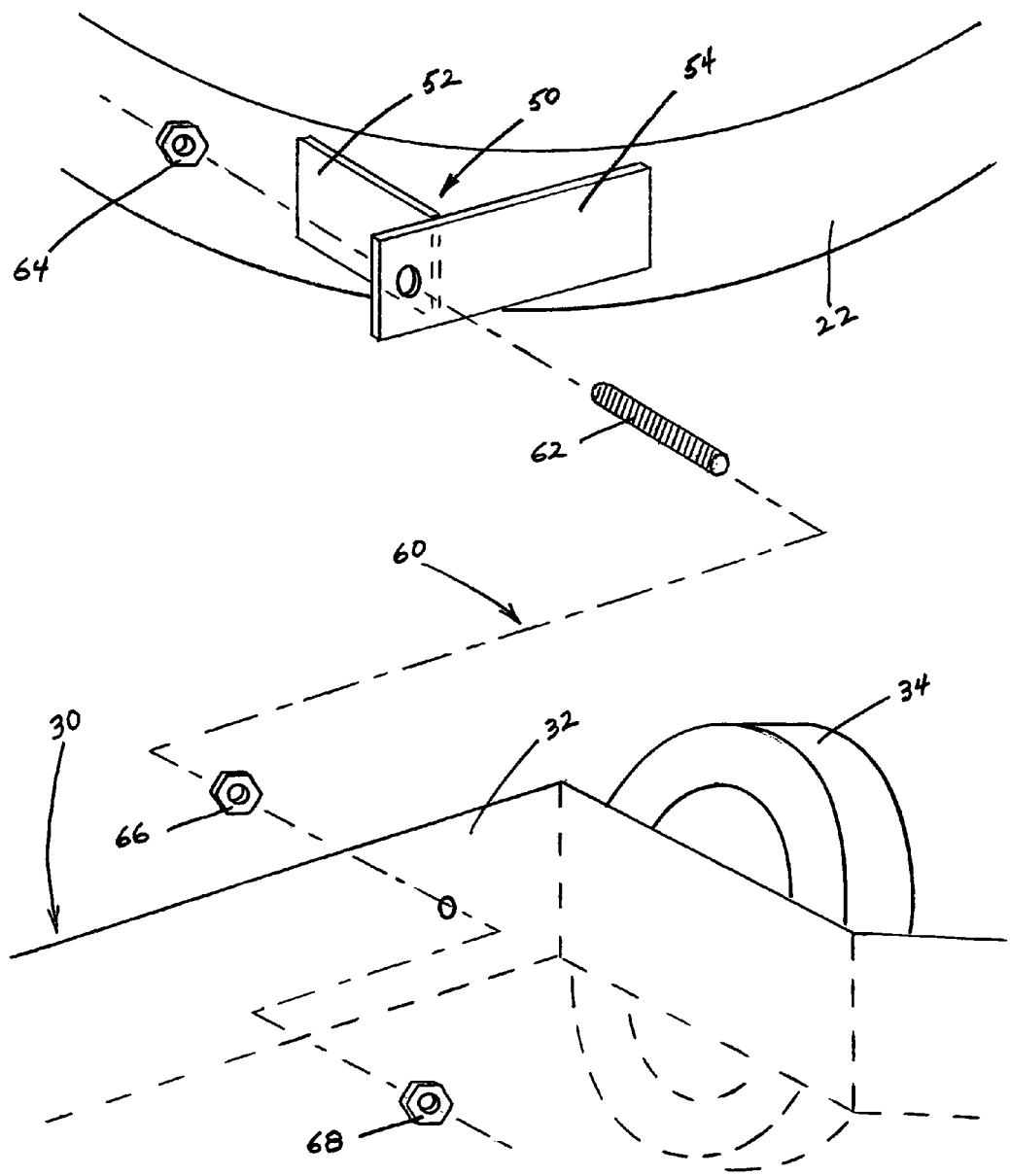
FIG. 6 is a detailed exploded isometric view of the bracket assembly and joint assembly.

FIG. 6 is a detailed exploded isometric view of the bracket assembly 50 and joint assembly 60. Joint stud 62 is a length of threaded rod installed in a hole of the mower deck of non-propelled mower 32. The location of the hole that receives the stud must match the location of the corresponding hole in lateral component of bracket assembly 54. That stud is rigidly held onto the mower deck by tightening joint nut 68 located on the inside of the deck and joint nut 66 located on the outside of the deck. Joint stud 62 protrudes beyond joint nut 66. The longitudinal component of bracket assembly 52 is rigidly fastened to the mower deck of propelled mower assembly 22 by suitable means such as welding. The lateral component of bracket assembly 54 is rigidly fastened to the longitudinal portion of the bracket assembly 52 by suitable means such as welding. The lateral component of bracket assembly 54 is rigidly fastened to the mower deck of propelled mower 22 by suitable means such as welding. The lateral component of bracket assembly 54 has a hole through which the protruding joint stud 62 is inserted. The location of the hole must match the location of the protruding joint stud 62. The diameter of the hole is big enough to provide a loose fit for joint stud 62 but small enough so that nuts 64 and 66 can not pass through the hole. Joint nut 64 is installed onto the end of joint stud 62 without making it tight. Joint nut 64 is left loose to create a joint that accommodates a wide range of angular motion relative to the longitudinal and lateral axes of the non-propelled mower assembly 30, permitting the non-propelled mower assembly 30 to roll and pitch over the terrain as necessary.

Figure 2:
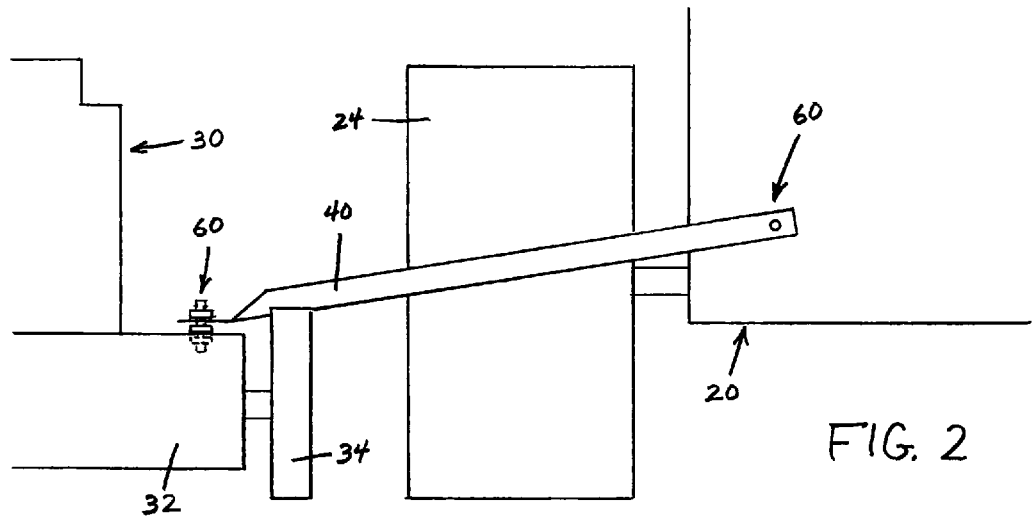

FIG. 2 is a straight-on view of the control arm 40 and its two corresponding joint assemblies 60. In the preferred embodiment all joint assemblies 60 are identical. The length of the control arm 40 is determined by factors such as the design of mower assemblies being used and the locations of joint assemblies 60 on the mower assemblies for attaching control arm 40. A critical consideration when designing the control arm is the amount of desired overlap between the decks of the propelled and non-propelled mowers. The orientation of the control arm relative to horizontal is also determined by factors such as the design of mower assemblies being used and the locations of joint assemblies 60 on the mower assemblies for attaching control arm 40.

Figure 3:
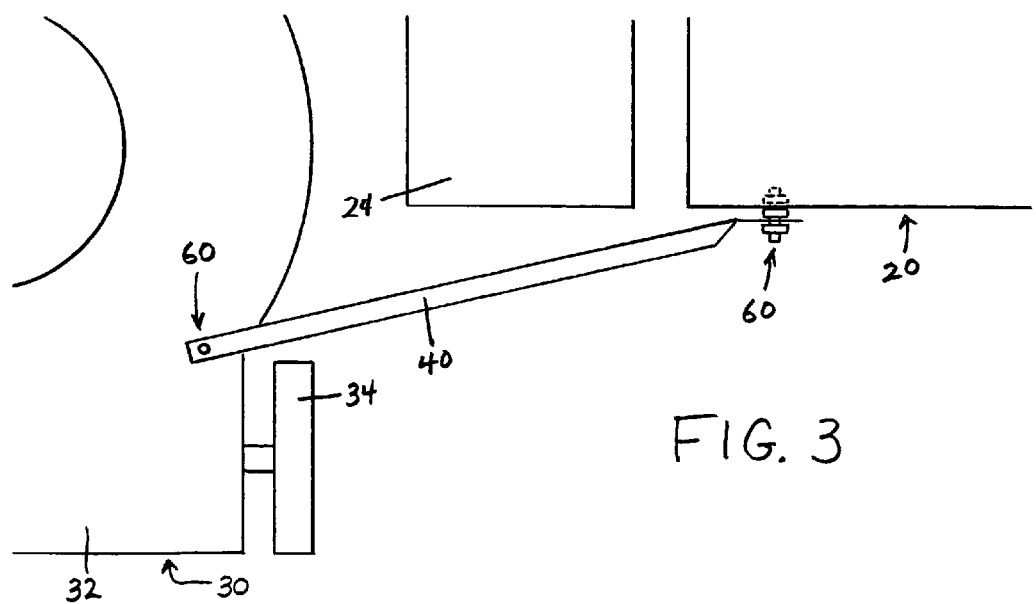
FIG. 3 is a top view of the control arm.

FIG. 3 is a top view of the control arm 40 and its two corresponding joint assemblies 60. In the preferred embodiment all joint assemblies 60 are identical. The length of the control arm is determined by factors such as the design of mower assemblies being used and the locations of joint assemblies 60 on the mower assemblies for attaching control arm 40. A critical consideration when designing the control arm is the amount of desired overlap between the decks of the propelled and non-propelled mowers. The orientation of the control arm relative to lateral axis is also determined by factors such as the design of mower assemblies being used and the locations of joint assemblies 60 on the mower assemblies for attaching control arm 40.

Figure 4:
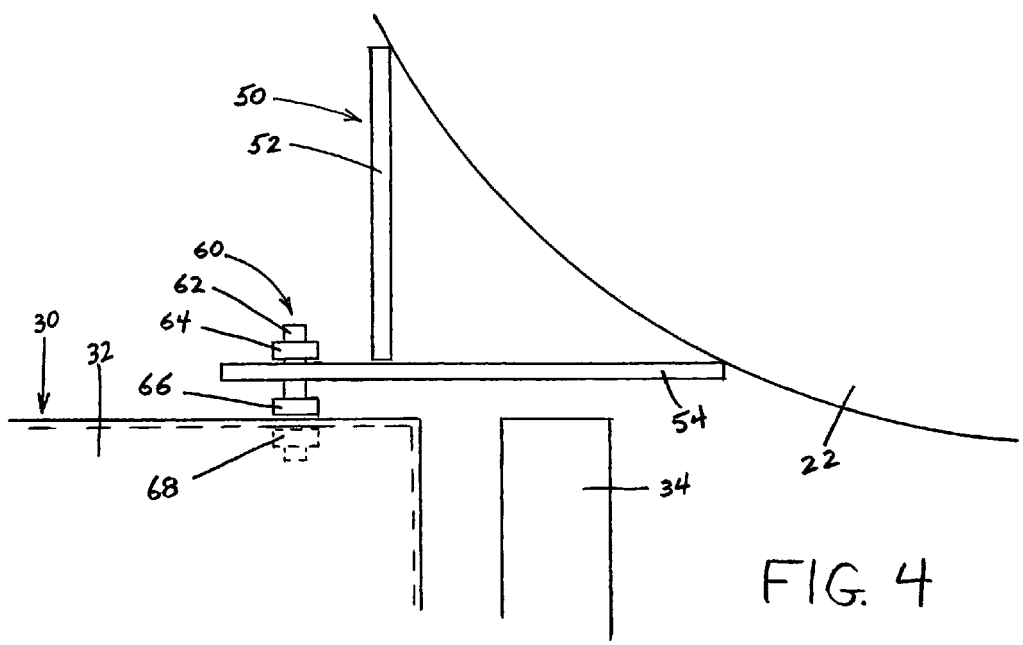
FIG. 4 is a detailed top view of the bracket assembly and joint assembly.

FIG. 4 is a top view of the bracket assembly 50 and its corresponding joint assembly 60. The lateral component of bracket assembly 54 is rigidly fastened to the mowing deck of the propelled mower 22 by suitable means such as welding. The longitudinal component of bracket assembly 52 is rigidly fastened to the mowing deck of the propelled mower 22 by suitable means such as welding. The lateral component of the bracket assembly 54 is rigidly fastened to the longitudinal portion of the bracket assembly 52 by suitable means such as welding. Joint stud 62 of joint assembly 60 is rigidly held onto mower deck of non-propelled mower assembly 32 by tightening joint nut 68 and joint nut 66. Joint stud 62 protrudes beyond joint nut 66. Joint nut 64 is installed onto joint stud 62 but not completely tightened leaving some play that accommodates a wide range of angular motion relative to longitudinal axis of the non-propelled mower assembly 30, permitting the non-propelled mower assembly 30 to pitch and roll as necessary. The lateral locations of bracket assembly 50 on mower deck 22 and its corresponding joint assembly 60 on mower deck 32 are chosen to provide the desired overlap of cutting swaths.

Figure 5:
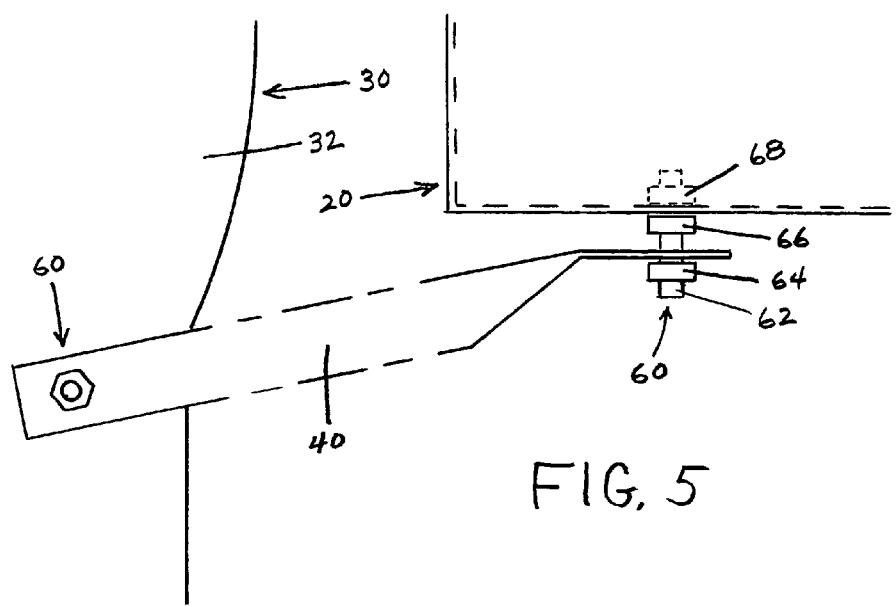
FIG. 5 is a detailed top view of the control arm and joint assemblies.

FIG. 5 is a top view of the control arm 40 and its two corresponding joint assemblies 60. In the preferred embodiment all joint assemblies 60 are identical. Details of one of the assemblies is shown in FIG. 5 where the control arm connects to the propelled mower assembly 20. Joint stud 62 of joint assembly 60 is rigidly held onto the propelled mower assembly 20 by tightening joint nut 68 and joint nut 66. Joint stud 62 protrudes beyond joint nut 66. Joint nut 64 is installed onto joint stud 62 but not completely tightened leaving some play that accommodates a wide range of angular motion relative to the lateral and longitudinal axes of the non-propelled mower assembly 30, permitting the non-propelled mower assembly 30 to pitch and roll as necessary. Joint stud 62 is a piece of threaded rod which is loosely fastened to the control arm 40. The joint stud 62 fits in a hole in the control arm 40 to create a joint that accommodates a wide range of angular motion relative to the lateral axis and the longitudinal axis of the non-propelled mower assembly 30, permitting the non-propelled mower assembly 30 to pitch and roll as necessary.

Additional Embodiments

In the preferred embodiment there are various possibilities regarding the location of the joints that connect the hitch to the propelled and the non-propelled mowers. The exact location will depend on several factors such as the mowers chosen.

As an alternative to having the hitch attach at the deck of the propelled mower, a y-arm arrangement could be substituted for that portion of the hitch. The y-arm has at least three connecting points, two of which could be on the propelled mower as shown in FIG. 7 and the third point would be on the non-propelled mower. If desired, the y-arm could connect to the non-propelled mower at two points and the propelled mower at one point. The y-arm embodiment of the invention possess all the advantages of the preferred embodiment.

The hitch shown in FIG. 7 utilizes the same control arm 40 as the preferred embodiment. However, a y-arm bracket assembly 70 is substituted for the bracket assembly in the preferred embodiment (see bracket assembly 50 in FIG. 1). The y-arm is connected the propelled mower assembly 20 using two joint assemblies 60. The joint assemblies 60 allows roll motion of the non-propelled mower assembly 30. The joint also accommodates a wide range of angular motion relative to a lateral axis of the non-propelled mower assembly 30, permitting the non-propelled mower assembly 30 to pitch freely. However, the y-arm bracket assembly 70 and control arm 40 work together to prevent the non-propelled mower assembly 30 from moving in the yaw direction relative to the vertical axis of the non-propelled mower assembly 30.

The second part of the hitch is a control arm 40. One end of control arm 40 is fastened to the propelled mower assembly 20 via a joint assembly 60. The other end of control arm 40 is fastened to the mower deck of the non-propelled mower 32 via a joint assembly 60. The two joint assemblies 60 located on the non-propelled mower assembly 30 allow the non-propelled mower assembly 30 to roll relative to the longitudinal axis of the non-propelled mower assembly 30 in order to follow the terrain.

Materials and Components

The movement at joint assemblies 60 is primarily rolling movement relative to the longitudinal axis and pitch movement relative to the lateral axis. Any joint design that permits the required movements can be used. The preferred embodiment uses horizontal and vertical studs. For example, properly oriented hinges could be used, or a combination of studs and hinges. A ball and socket joint could also be used if it provides the required rotational and angular motion. The preferred embodiment uses the same joint at all locations. The same joint is used for several reasons including: uniformity, and the ability to accommodate varying mounting positions required by the devices being connected.

Common materials are used in the preferred embodiment. Any suitable rigid linear material can be used for control arm 40. Metal tubing can be used for control arm 40, flattened and bent at each end to accommodate joint assemblies 60. Each flattened end has a hole of sufficient diameter that receives the joint stud 62. The hole is of sufficient diameter to permit the rotational and angular movement requirements.

Bracket assembly 50 was attached by welding, however, other suitable means for attachment could include nuts and bolts, requiring only minor variations.

Joint nut 64 can be installed using a thread locking compound or the nut could be of the self locking type.

The drawings include wheels on the non-propelled mower assemblies for clarity and completeness, but the wheels are not part of the invention. There are other choices for supporting the non-propelled mower assemblies including: wheels on fixed axles, caster wheels, and skids.

I claim:

1. A hitch that connects a propelled mower assembly to a non-propelled mower assembly for allowing the non-propelled mower assembly to be pushed or pulled without jackknifing thereby permitting travel in either direction, while individual mower decks of the propelled mower assembly and the non-propelled assembly are free to follow terrain independently of each other, while keeping travel paths of the mower assemblies parallel at all times;

wherein said hitch has two and only two separate rigid connectors pivotally attaching and interconnecting the propelled mower assembly and the non-propelled mower assembly to accommodate rotational motion of the non-propelled mower assembly in more than one plane with respect to the propelled mower assembly;

wherein said two separate rigid connectors each have at least one distinct point of connection to the propelled mower assembly and at least one distinct point of connection to the non-propelled mower assembly at joints that pivot about a horizontal or vertical axis, the propelled mower assembly having at least one point of connection to each of said two separate rigid connectors and the non-propelled mower assembly having at least one point of connection to each of said two separate rigid connectors;

wherein one of said two separate rigid connectors is fastened to the mower deck of the propelled mower assembly;

wherein one of the rigid connectors is a bracket assembly having a joint that pivots about a horizontal axis in the direction of travel located between the non-propelled mower assembly and the propelled mower assembly;

wherein the other of said rigid connectors is a control arm located between the propelled mower assembly and the non-propelled mower assembly, said control arm having a propelled mower assembly joint at one end that pivots about a horizontal axis in the direction of travel and a non-propelled mower assembly joint at the other end that pivots about a vertical axis.

2. The hitch in claim 1 wherein one of the rigid connectors is a bracket assembly having a joint that pivots about a horizontal axis in the direction of travel located between the non-propelled mower assembly and the propelled mower assembly.

3. The hitch in claim 2 wherein the joint of the bracket assembly permits roll movement of the non-propelled mower assembly.

4. The hitch in claim 2 wherein the joint of the bracket assembly permits pitch movement of the non-propelled mower assembly.

5. The hitch in claim 1 wherein the other of said rigid connectors is a control arm located between the propelled mower assembly and the non-propelled mower assembly, said control arm having a propelled mower assembly joint at one end that pivots about a horizontal axis in the direction of travel and a non-propelled mower assembly joint at the other end that pivots about a vertical axis.

6. The hitch in claim 5 wherein the propelled mower assembly joint and the non-propelled mower assembly joint allow roll movement of the non-propelled mower assembly.

7. The hitch in claim 5 wherein the propelled mower assembly joint and the non-propelled mower assembly joint allow pitch movement of the non-propelled mower assembly.

8. The hitch in claim 1 wherein yaw movement of the non-propelled mower assembly is prevented.

9. The hitch in claim 1 wherein the non-propelled mower assembly rotates around the yaw axis of the propelled mower assembly.

10. A hitch for connecting a propelled mower assembly to a non-propelled mower assembly, said hitch having two and only two separate rigid connectors pivotally attaching and interconnecting the non-propelled mower assembly and the propelled mower assembly, while keeping travel paths of the mower assemblies parallel at all times;
wherein said two separate rigid connectors each have at least one distinct point of connection to the propelled mower assembly and at least one distinct point of connection to the non-propelled mower assembly, the propelled mower assembly having at least one point of connection to each of said two separate rigid connectors and the non-propelled mower assembly having at least one point of connection to each of said two separate rigid connectors;
wherein one of said two separate rigid connectors is fastened to the mower deck of the propelled mower assembly;
wherein one of the rigid connectors is a bracket assembly having a joint that pivots about a horizontal axis in the direction of travel located between the non-propelled mower assembly and the propelled mower assembly;
wherein the other of said rigid connectors is a control arm located between the propelled mower assembly and the non-propelled mower assembly, said control arm having a propelled mower assembly joint at one end that pivots about a horizontal axis in the direction of travel and a non-propelled mower assembly joint at the other end that pivots about a vertical axis.

11. The hitch in claim 10 wherein the propelled mower assembly and the non-propelled mower assembly are free to roll independently of each other when connected by said hitch.

12. The hitch in claim 10 wherein the propelled mower assembly and the non-propelled mower assembly are free to pitch independently of each other when connected by said hitch.

13. The hitch in claim 10 wherein yaw movement of the non-propelled mower assembly is prevented.

14. The hitch in claim 10 wherein the non-propelled mower assembly rotates around the yaw axis of the propelled mower assembly.

15. A hitch that connects a propelled mower assembly to a non-propelled mower assembly for allowing the non-propelled mower to be pushed or pulled without jackknifing thereby permitting travel in either direction, while mower decks of the propelled mower assembly and the non-propelled assembly are free to follow terrain independently of each other, said hitch having two and only two separate rigid connectors pivotally attaching and interconnecting the non-propelled mower assembly and the propelled mower assembly to accommodate rotational motion of the non-propelled mower assembly in more than one plane with respect to the propelled mower assembly, while keeping travel paths of the mower assemblies parallel at all times;
wherein said two separate rigid connectors each have at least one distinct point of connection to the propelled mower assembly and at least one distinct point of connection to the non-propelled mower assembly, the propelled mower assembly having at least one point of connection to each of said two separate rigid connectors and the non-propelled mower assembly having at least one point of connection to each of said two separate rigid connectors;
wherein one of said two separate rigid connectors is fastened to the mower deck of the propelled mower assembly;
wherein one of the rigid connectors is a bracket assembly having a joint that pivots about a horizontal axis in the direction of travel located between the non-propelled mower assembly and the propelled mower assembly;
wherein the other of said rigid connectors is a control arm located between the propelled mower assembly and the non-propelled mower assembly, said control arm having a propelled mower assembly joint at one end that pivots about a horizontal axis in the direction of travel and a non-propelled mower assembly joint at the other end that pivots about a vertical axis.

\* \* \* \* \*